(12) United States Patent
Farr et al.

(10) Patent No.: US 6,232,751 B1
(45) Date of Patent: May 15, 2001

(54) EXCITATION CONTROL SYSTEM

(75) Inventors: Lawrence B. Farr, Asheville; Irving A. Gibbs, Fletcher; Charles A. Morse, Arden; Charles R. Mummert, Hendersonville, all of NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/458,525

(22) Filed: Dec. 13, 1999

(51) Int. Cl.$^7$ ........................................ H02P 9/10
(52) U.S. Cl. ................................... 322/59; 322/37
(58) Field of Search ........................ 322/28, 36, 59, 322/37

(56) References Cited

U.S. PATENT DOCUMENTS

| | | | |
|---|---|---|---|
| 3,936,722 | * | 2/1976 | Goto et al. ........................ 322/20 |
| 5,440,222 | * | 8/1995 | Tanaka et al. ..................... 322/25 |
| 5,483,147 | * | 1/1996 | Llic et al. ......................... 322/25 |

* cited by examiner

*Primary Examiner*—Nicholas Ponomarenko
(74) *Attorney, Agent, or Firm*—Martin J. Moran

(57) ABSTRACT

An excitation control system for a generator includes an SCR bridge for providing an excitation voltage to the input of the generator; a regulator for regulating the excitation voltage; and a sensing sub-system for providing an electrical signal, such a generator current or generator watts, which is related to the output of the generator. The generator includes a circuit breaker for the one or more alternating current phases output by the generator. An output of the circuit breaker has a signal with a true state when the circuit breaker is closed and the generator is on-line and with a false state when the circuit breaker is open and the generator is off-line. A comparator provides a validation signal when the generator electrical signal is greater than a predetermined signal, such as minimum generator current or minimum generator watts, respectively. An OR gate qualifies the signal of the output of the circuit breaker with the validation signal and provides a qualified signal therefrom. Trip and protection logic employs the qualified signal for protecting or tripping the generator.

9 Claims, 3 Drawing Sheets

EXCITATION CONTROL SYSTEM

CROSS REFERENCE TO RELATED APPLICATION

This Application is related to commonly assigned, copending application Ser. No. 09/304,479, filed May 3, 1999, entitled "Excitation Control System for Rotating Electrical Apparatus" by Gibbs.

BACKGROUND OF THE INVENTION

1. Field of the Invention

This invention pertains generally to excitation control systems for rotating electrical apparatus and, more particularly, to such systems which provide excitation voltage to a generator.

2. Background Information

Three-phase rectifier circuits are commonly employed to convert AC signals to DC signals. These circuits often use SCRs disposed in bridge segments, with typically one SCR for each polarity of each AC phase. Typically, a bridge firing control circuit controls the firing point for each rectifier in each AC cycle.

SCR bridges are commonly employed in an excitation control system to provide field excitation for a rotating electrical apparatus (e.g., large synchronous generators and motors, utility synchronous generators and motors, industrial synchronous generators and motors, synchronous generators and motors for naval or other shipping applications, synchronous generators and motors for oil well drilling rigs).

For example, when the generator is on-line, generator field excitation is provided thereto. Whenever the generator is on-line and providing power to a load, the generator circuit breaker is closed. An auxiliary contact of the generator circuit breaker is employed to indicate the closed or open status of the breaker and, thus, the on-line or off-line status, respectively, of the generator. In turn, generator tripping logic or protection logic employs this closed or open status to adjust trip thresholds in the trip logic or to adjust limiters in the protection logic.

If the auxiliary contact erroneously indicates an off-line status for an on-line generator, then the trip or protection logic may cause a reduction of excitation to the online generator and, thus, cause it to improperly enter the off-line state, thereby interrupting power to the load and adversely impacting the availability of the generator.

Accordingly, there is room for improvement.

SUMMARY OF THE INVENTION

The present invention provides improvements in an excitation control system for a rotating electrical apparatus. An electrical signal related to the output of the rotating electrical apparatus is provided. A validation signal, which is representative of the rotating electrical apparatus having an on-line state, is provided when the electrical signal is greater than a predetermined signal. In turn, the validation signal is employed by protection logic or tripping logic for the rotating electrical apparatus.

In accordance with one aspect of the invention, an excitation control system includes means for providing an excitation voltage to the input of a rotating electrical apparatus; means for regulating the excitation voltage; means for providing an electrical signal related to the output of the rotating electrical apparatus; means for providing a logic signal having a first state when the electrical signal is greater than a predetermined signal and the rotating electrical apparatus is in an on-line state, with the logic signal otherwise having a second state; means employing the first state of the logic signal for providing online protection or trip parameters, and employing the second state of the logic signal for providing off-line protection or trip parameters; and means employing said protection or trip parameters for protecting or tripping the rotating electrical apparatus.

As another aspect of the invention, the signal of the output of the circuit breaker for a rotating electrical apparatus is qualified with a validation signal and the qualified signal is employed for protecting or tripping the rotating electrical apparatus. In particular, an excitation control system for the rotating electrical apparatus includes an input responsive to an excitation voltage, an output having at least one alternating current phase, and a circuit breaker for such at least one alternating current phase. The circuit breaker includes an output having a signal with a first state when the circuit breaker is closed and the rotating electrical apparatus is on-line, and with a second state when the circuit breaker is open and the rotating electrical apparatus is off-line. The excitation control system includes means for providing the excitation voltage to the input of the rotating electrical apparatus; means for regulating the excitation voltage; means for providing an electrical signal related to the output of the rotating electrical apparatus; means for providing a validation signal when the electrical signal is greater than a predetermined signal; means for qualifying the signal of the output of the circuit breaker with the validation signal and providing a qualified signal therefrom; and means employing the qualified signal for protecting or tripping the rotating electrical apparatus.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
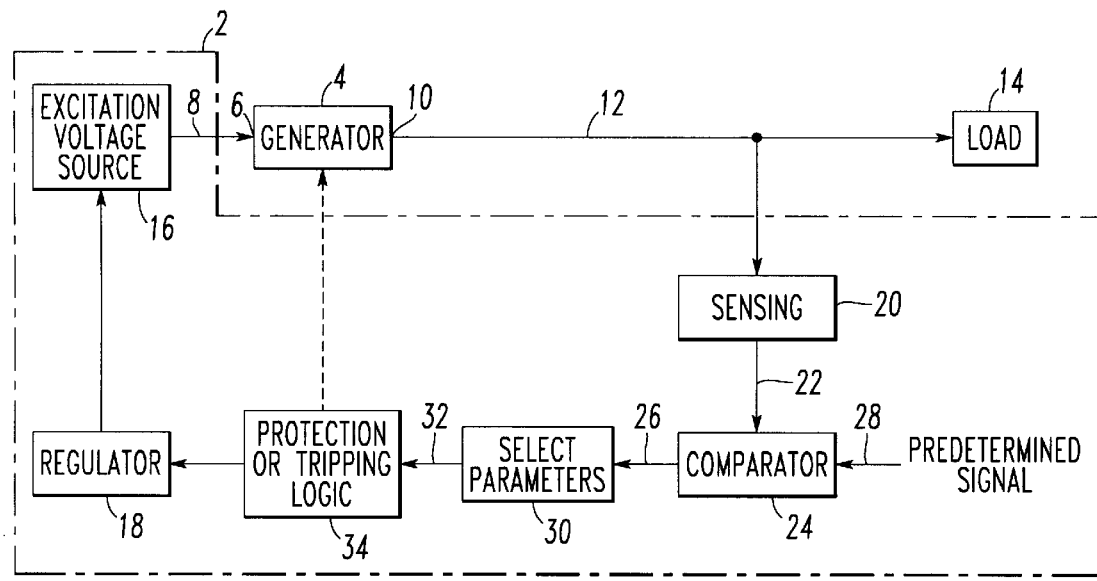
FIG. 1 is a block diagram of an excitation control system in accordance with the invention.

Referring to FIG. 1, an excitation control system 2 for a rotating electrical apparatus, such as the exemplary generator 4, is illustrated. The generator 4 includes an input 6 responsive to an excitation voltage 8 and an output 10 having one or more alternating current phases 12, each having a current flowing therein and a voltage, which supply power to a load 14. One or more circuit breakers (not shown) may be disposed between the generator 4 and the load 14.

The exemplary excitation control system 2 includes an excitation voltage source 16 which provides the excitation voltage 8 to the input 6 of the generator 4, and a regulator

18 for regulating the excitation voltage. A sensing subsystem 20 for the alternating current phases 12 senses generator current and/or generator voltage and provides an electrical signal 22 (e.g., generator line current, generator watts) related to the output of the generator 4.

A comparator 24 provides a logic signal 26 having a first state (i.e., 1 or on-line) when the electrical signal 22 is greater than a predetermined signal 28 (e.g., minimum generator line current, minimum generator watts, respectively) and the generator 4 is in an on-line state. Otherwise, the logic signal 26 has a second state (i.e., 0 or off-line). In turn, selection logic 30 employs the first state of the logic signal 26 to provide a first set of protection or trip parameters 32 and employs the second state of the logic signal 26 to provide a second set of such parameters 32. Protection or tripping logic 34 employs the protection or trip parameters 32 for protecting or tripping the generator 4.

The exemplary excitation control system 2 differs from a conventional excitation control system in that the auxiliary contact(s) of the generator circuit breaker (not shown), which provide a "52g signal" whenever such circuit breaker is closed and the generator 4 is supplying power to the load 14, are not employed by control system 2. Instead, the exemplary comparator 24, which provides the logic signal 26, and selection logic 30 cooperate to provide the appropriate set of on-line or off-line protection or trip parameters 32. Hence, the exemplary system 2 does not require a generator circuit breaker having auxiliary contacts (e.g., as in the generator circuit breaker 36 and 52g signal 38 of FIG. 2).

Figure 2:
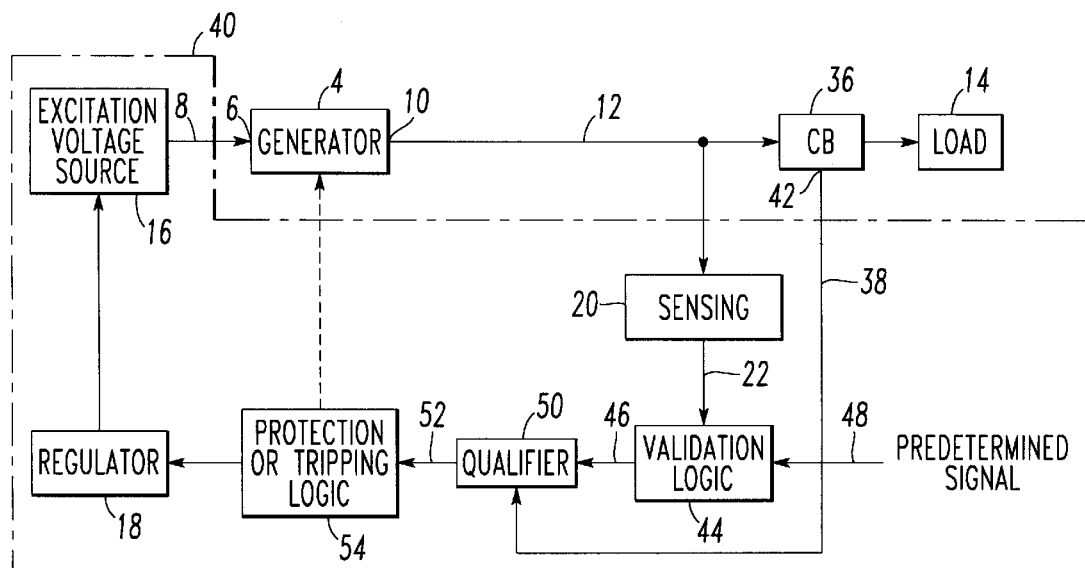
FIG. 2 is a block diagram of an excitation control system in accordance with another embodiment of the invention.

FIG. 2 shows another exemplary excitation control system 40 for the generator 4 which has the generator circuit breaker 36 for the one or more alternating current phases 12. The circuit breaker 36 has an output 42 with the 52g signal 38 provided by an auxiliary contact (not shown) of that breaker. The 52g signal 38 has a first state (e.g., active or 1) when the circuit breaker 36 is closed and the generator 4 is on-line, and a second state (e.g., inactive or 0) when the circuit breaker 36 is open and the generator 4 is off-line. Thus, the 52g signal 38 switches between the off-line and on-line modes of the generator 4.

The excitation control system 40 includes the excitation voltage source 16, the regulator 18, and the sensing subsystem 20. Validation logic 44 for the 52g signal 38 provides a validation signal 46 when the electrical signal 22 (e.g., generator line current, generator watts) is greater than a predetermined signal 48 (e.g., minimum generator line current, minimum generator watts, respectively). In turn, qualifier logic 50 qualifies the 52g signal 38 with the validation signal 46 and provides a qualified signal 52. Protection or tripping logic 54 employs the qualified signal 52 to select suitable protection or tripping parameters for protecting or tripping the generator 4. In the preferred embodiment, the qualifier logic 50 employs an "OR" function to logically "or" the 52g signal 38 with the validation signal 46 in order to provide the qualified signal 52 therefrom.

Figure 3:
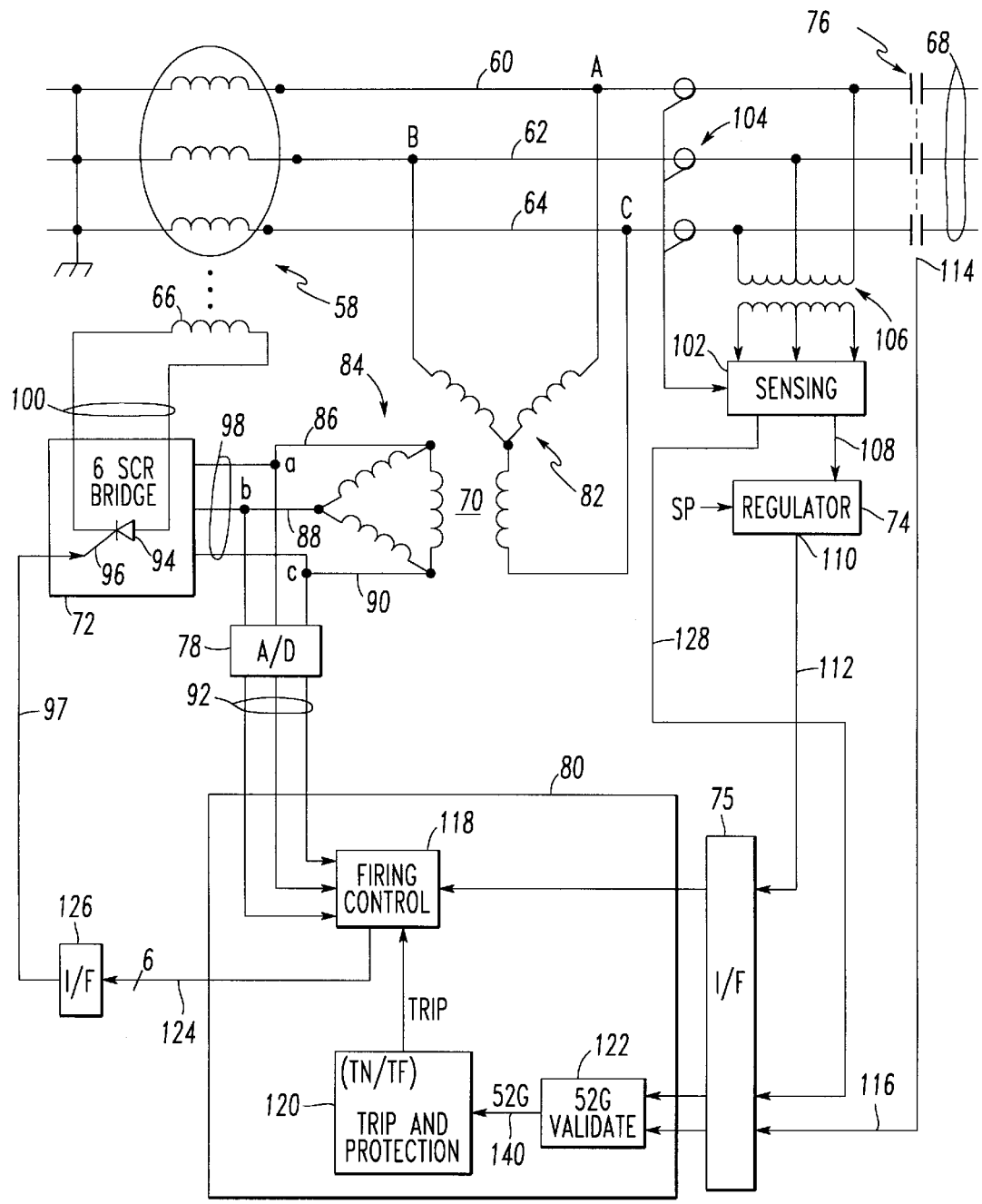
FIG. 3 is a more detailed block diagram of an excitation control system in accordance with the embodiment of FIG. 2.

Referring to FIG. 3, another excitation control system 56 for a three-phase generator 58 is illustrated. The generator 58 includes an output having three alternating current (AC) phases 60,62,64 (A,B,C) and a generator field input 66 responsive to an excitation voltage. The three phases 60,62, 64 output by the generator 58 provide power to a power circuit 68.

The excitation control system 56 includes a transformer 70, a controlled rectifier bridge 72, a regulator sub-system 74, an interface (I/F) 75 to the generator's circuit breaker 76, analog-to-digital (A/D) converters 78, and a suitable processor, such as microprocessor (µP) 80. The exemplary transformer 70 is a three-phase power potential transformer (PPT) including three primary windings 82 in a WYE-configuration and three corresponding secondary windings 84 in a delta-configuration, although other transformer configurations may be employed (e.g., a delta-configuration in the primary and a delta-configuration in the secondary). The primary windings 82 are interconnected with the AC phases 60,62,64, while the corresponding secondary windings 84 have three AC phases 86,88,90 (a,b,c), respectively, each of which has a positive polarity and a negative polarity and a common frequency (e.g., 50 Hz, 60 Hz). The µP 80 typically receives two or three digital AC signals 92 from the secondary or bridge side of the PPT 70. The PPT 70 is normally connected to the terminals of the generator 58 and, thus, this exemplary system is commonly referred to as a "terminal fed excitation system." Alternatively, the PPT 70 may be connected to any other source of three phase voltages. This alternative system is commonly referred to as an "auxiliary bus fed excitation system."

Bridges of semiconductor controlled rectifiers (SCRs), such as bridge 72, are generally employed to convert alternating current (AC) sinusoidal signal waveforms to direct current (DC). The exemplary bridge 72 receives a multiphase current input from a common AC source, such as power potential transformer (PPT) 70, although other sources (e.g., a motor generator, field transformer) may be employed. A three-phase current input is employed in this example, although the invention is applicable to a wide range of phase counts.

The exemplary bridge 72 has six cells or segments, one for each polarity of each of the phase currents, although the invention is applicable to a wide range of segment counts. Each bridge segment includes its own element, such as the exemplary SCR 94, that has a firing input 96. When a suitable control signal 97 is provided to one of the inputs 96, the corresponding SCR fires to, thereby, control current conduction (e.g., by starting or initiating current conduction) within the corresponding segment between the input 98 and the output 100 of the bridge 72. Typically, as is well-known in the art, the individual segments of the bridge 72 are fired every 60° of the AC cycle. One of the SCRs 94 does not stop conducting until it is reversed biased.

The input 98 of the bridge 72 is interconnected with the AC phases 86,88,90 of the secondary windings 84 of the transformer 70. All of the positive rectifier output currents are summed together and the negative rectifier output currents are similarly summed and conveyed by corresponding positive and negative conductors of output 100 to the generator field input 66 in order to provide the excitation voltage thereto.

The regulator sub-system 74 functions to regulate the output of the generator 58 in terms of phase current and three-phase voltage of the AC phases 60,62,64. The sensing sub-system 102 includes one or more current transformers (CT) 104 and a three-phase potential transformer (PT) 106 which provide corresponding current and voltage signals from the power circuit 68 to the sensing sub-system 102. In turn, an output 108 of the sub-system 102 is input by the regulator sub-system 74 along with one or more setpoints SP. The regulator sub-system 74 employs a suitable control algorithm in order to provide, at output 110, a regulator output signal 112 which, under appropriate conditions, requests a maximum value of the excitation voltage for the generator 58 at the generator field input 66. In particular, the control algorithm increases excitation in response to dips in terminal voltage and decreases excitation in response to increases in terminal voltage. When the terminal voltage decreases without suitable response, the output 110 of the regulator sub-system 74, which feeds a firing control function 118 of the $\mu$P 80, integrates to its maximum value.

For example, the regulator output signal 112 is typically employed to maintain the three-phase voltages to the power circuit 68 (as measured by PT 106) and to increase or decrease the excitation voltage to the generator 58 with respective higher or lower levels of current (as measured by CT 104). In order to accomplish that change, the firing angle employed by the bridge 72 is retarded (reduced) or advanced (increased) to increase or decrease, respectively, the excitation voltage. Thus, if the three-phase voltage of the power circuit 68 goes down, then the regulator output signal 112 goes up, thereby reducing the firing angle and providing more field current to the generator 58.

As is well-known, the generator circuit breaker 76 is employed to connect and disconnect the output of the generator 58 to the power circuit 68. The circuit breaker 76 includes an output 114 having a "52g signal" 116 which indicates that the circuit breaker separable contacts are closed and the generator 58 is connected to the power circuit 68. Preferably, as is also well-known, the breaker 76 includes one or more auxiliary contacts (not shown) which provide the 52g signal 116.

The exemplary $\mu$P 80 includes the firing control function 118, a trip and protection function 120, and a 52g validation function 122. The exemplary firing control function 118 preferably includes a phase locked loop (PLL) (not shown), which, alternatively, may be implemented by analog or hybrid circuits (not shown). The firing control function 118 receives from the A/D converter 78 three digital AC signals 92 which represent the voltage of the three AC phases 86,88,90. The PLL locks to those signals 92 and generates an error signal (not shown). The error signal is employed to create a phase reference signal (not shown) for the firing control function 118. With disturbances in the input voltage to the PLL, the error signal changes and, thus, causes the phase reference signal to change. In turn, a phase control circuit (not shown) employs the phase reference signal to determine exactly when to fire each SCR in the SCR bridge 72 and, thereby, generate the six firing signals 124 which are output by interface (I/F) 126 to the bridge 72. It will be appreciated that the generator 58 and the excitation control system 56 employ a suitable generator starting circuit and algorithm (not shown) for controlling initial start-up of the generator 58 (e.g., when there is no voltage being output by the generator to the three phases 60,62,64).

Figure 4:
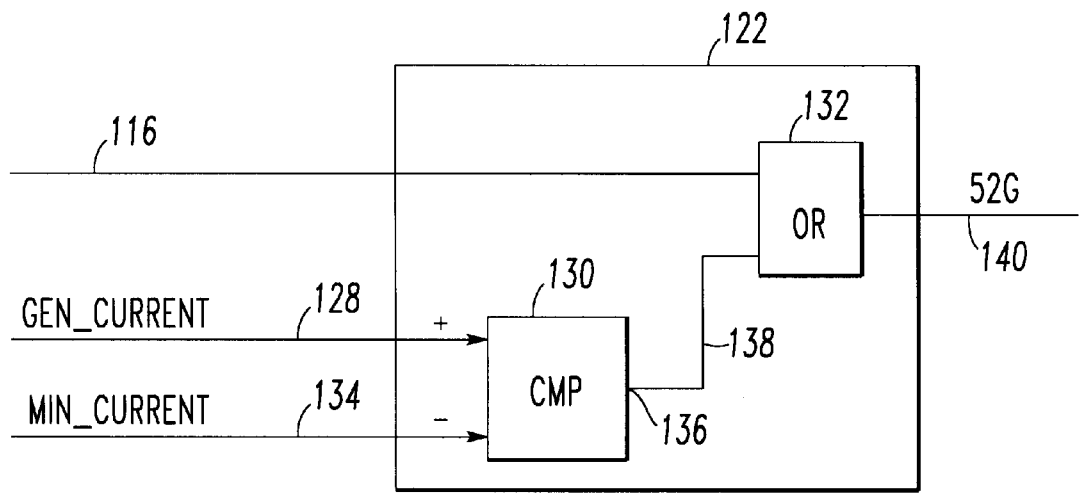
FIG. 4 is a block diagram of validation logic which employs generator line current to validate a "$52g$ signal" from a generator circuit breaker.
Figure 5:
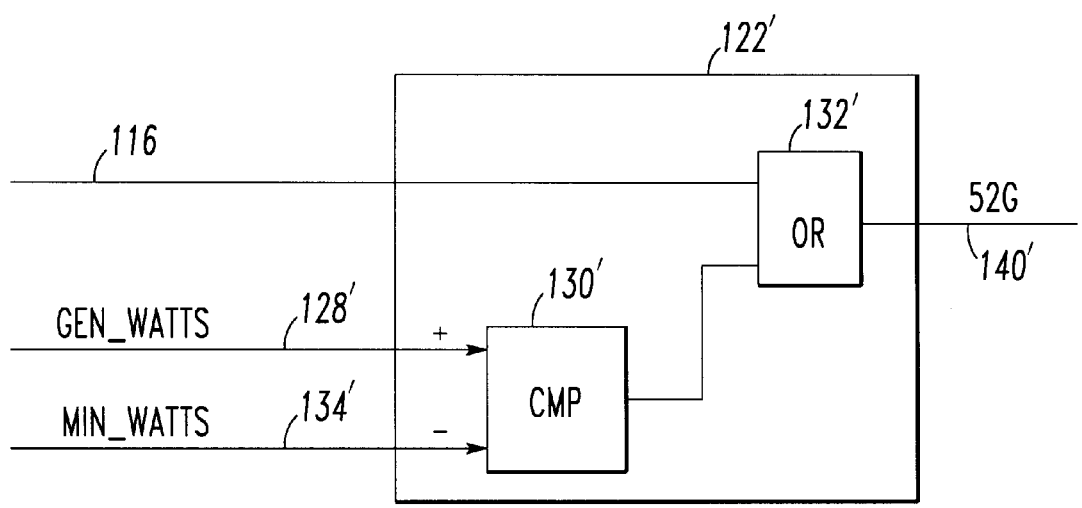
FIG. 5 is a block diagram of validation logic which employs generator watts to validate the $52g$ signal.

The 52g validation function 122 inputs from the sensing sub-system 102 and through interface 75 a signal 128 which is related to the output of the generator 4 (e.g., generator line current, generator watts). As shown in FIGS. 4 and 5, validation logic employs generator line current and/or generator watts to validate the 52g signal 116 and, thereby, eliminate needless trips of the generator 58. The exemplary 52g validation function 122 of FIG. 4 includes comparator (CMP) 130 and OR logic 132. The comparator 130 compares a generator current signal (GEN_CURRENT) 128 from the sensing sub-system 102 of FIG. 3 with a predetermined minimum generator current signal (MIN_CURRENT) 134. When the generator current signal 128 exceeds the predetermined minimum generator current signal 134, then the output 136 of the comparator 130 has a validation signal 138 (e.g., on or 1) which is received by one input of the OR logic 132. The other input of the OR logic 132 receives the 52g signal 116. Thus, the exemplary OR logic 132 qualifies the 52g signal 116 with the validation signal 138 and outputs a qualified 52G signal 140. In turn, as shown in FIG. 3, the qualified 52G signal 140 is employed by the trip and protection logic 120.

The 52g signal 116 is normally provided by an auxiliary contact of the generator circuit breaker 76. If the generator 58 is on-line, as indicated by the 52g signal 116 being active, then an on-line current limiter (not shown) of the trip and protection logic 120 employs a suitably high trip threshold (TN). Otherwise, if the generator 58 is off-line, as indicated by the 52g signal 116 being inactive, then an off-line current limiter (not shown) employs a much lower trip threshold (TF).

One type of a faulty 52g signal (e.g., in which a normally active signal is improperly reported as being inactive) causes a reduction in excitation to an otherwise healthy and on-line generator 58, thereby causing a trip and forcing the generator off-line. This may result from the trip threshold being lowered in error and/or an erroneous reduction in excitation.

For example, the field current limiters may employ an on-line trip threshold of about 300 A to 400 A in order to permit a relatively slow trip response as well as to support simultaneous firing of all of the SCRs 94 of the exemplary bridge 72 of FIG. 3. Otherwise, in this example, an off-line trip threshold of about 100 A (e.g., about 25% to 33% of the on-line threshold) is employed to permit an instantaneous trip.

As a further example, without the validation function 122, if the exemplary 52g signal 116 improperly goes to an inactive state, then the on-line generator 58 may become under-excited and a trip may initiate from an external relay as a result of loss of excitation protection.

As another example, if the on-line generator 58 is at full-load, there is no validation function 122, and the 52g signal 116 improperly goes inactive, then the on-line limiter does not work and, thus, protection logic would trip the generator 58 as the field current is not permitted to exceed an off-line setpoint.

In either case, the exemplary validation function provides more reliable protection and improves the availability of the generator 58. With the exemplary validation logic 122, the desired result is to avoid improper trips and, thus, appropriately maintain operation of the generator 58. Otherwise, with a faulty 52g signal 116, a normally active signal is improperly reported as being inactive. This erroneous condition is corrected by the validation logic 122.

Preferably, the sensing sub-system 102 of FIG. 3 employs isolation and scaling transformers and analog to digital converters to provide the microprocessor 80 with the signals from which DC values proportional rms current and watts are created and, thus, outputs the generator current signal 128. In the exemplary embodiment, the predetermined minimum generator current signal 134 is typically set to be 105% of no load field current off-line and 125% of full load field current on-line.

If the generator is inactive, then the timing characteristic of an over flux (volts per hertz) limiter is suitably adjusted for the on-line or off-line condition of the generator. As a result, excessive overvoltage when the machine is off-line is minimized.

If the generator is inactive, then protective features associated with generator line quantities (e.g., line current, kilowatt load, kilovar load) are disabled.

If the generator is inactive, the transformer 70 is disconnected from the controlled rectifier bridge 72 by enabling a disconnect device (not shown) therebetween. As a result, possible loss of field associated with an accidental operation of the disconnect device is eliminated.

The exemplary 52g validation function 122' of FIG. 5 includes comparator (CMP) 130' and OR logic 132'. The comparator 130' compares a generator watts signal (GEN_WATTS) 128' from the sensing sub-system 102 of FIG. 3 with a predetermined minimum generator watts signal (MIN_WATTS) 134'. When the generator watts signal 128' exceeds the predetermined minimum generator watts signal 134', then the output of the comparator 130' has a validation signal which is received by one input of the OR logic 132'. The other input of the OR logic 132' receives the 52g signal 116. In turn, the exemplary OR logic 132' outputs a qualified 52G signal 140' which is employed by corresponding trip and protection logic (not shown).

Preferably, the sensing sub-system 102 of FIG. 3 employs analog to digital converters and a phase lock loop to provide the magnitude and phase angle of the generator line currents and voltage and, thus, outputs the generator current and watts signal 128'. In the exemplary embodiment, the predetermined minimum generator watts signal 134' is set to 5% of rated generator load. This can be adjusted in a range from less than 0.01% to over 20% of generator rated load.

Another type of faulty 52g signal 116 (e.g., a normally inactive signal is reported as being active) might cause an increase in excitation to an off-line generator. This problem is not addressed by the exemplary validation logic of FIGS. 4 and 5. In this example, a suitable validation function (not shown) would include a comparator (not shown) and AND logic (not shown). The comparator compares a suitable generator signal (e.g., GEN_CURRENT) with a predetermined generator threshold signal (e.g., THRES_CURRENT). Preferably, generator current, for example, is monitored by three CTs in a three-phase system in order to reduce the possibility that all CTs might be inoperative. When the generator threshold signal exceeds the generator signal, then the output of the comparator has a validation signal (e.g., off or 0) which is received by one input of the AND logic. The other input of the AND logic receives the 52g signal 116. Thus, the exemplary AND logic qualifies the 52g signal 116 with the validation signal and outputs a qualified 52G signal.

While specific embodiments of the invention have been described in detail, it will be appreciated by those skilled in the art, that various modifications and alternatives to those details could be developed in light of the overall teachings of the disclosure. Accordingly, the particular arrangements disclosed are meant to be illustrative only, and not limiting as to the scope of invention which is to be given the full breadth of the claims appended and any and all equivalents thereof.

What is claimed is:

1. An excitation control system for a rotating electrical apparatus including an input responsive to an excitation voltage and including an output having at least one alternating current phase, said excitation control system comprising:

means for providing said excitation voltage to the input of said rotating electrical apparatus;

means for regulating said excitation voltage;

means for providing an electrical signal related to said output of said rotating electrical apparatus;

means for providing a logic signal having a first state when said electrical signal is greater than a predetermined signal and said rotating electrical apparatus is in an on-line state, said logic signal otherwise having a second state;

means employing the first state of said logic signal for providing on-line protection or trip parameters, and employing the second state of said logic signal for providing off-line protection or trip parameters; and means employing said protection or trip parameters for protecting or tripping said rotating electrical apparatus.

2. The excitation control system of claim 1 wherein said rotating electrical apparatus is a generator; wherein said electrical signal is generator line current; and wherein said predetermined signal is minimum generator line current.

3. The excitation control system of claim 1 wherein said rotating electrical apparatus is a generator; wherein said electrical signal is generator watts; and wherein said predetermined signal is minimum generator watts.

4. The excitation control system of claim 1 wherein the output of said rotating electrical apparatus includes a plurality of alternating current phases each having current flowing therein; and wherein said means for providing an electrical signal includes means for providing a current signal as said electrical signal.

5. The excitation control system of claim 1 wherein the output of said rotating electrical apparatus includes a plurality of alternating current phases each having a current flowing therein and a voltage; and wherein said means for providing an electrical signal includes means for providing a power signal as said electrical signal from said currents and said voltages.

6. An excitation control system for a rotating electrical apparatus including an input responsive to an excitation voltage, an output having at least one alternating current phase, and a circuit breaker for said at least one alternating current phase, said circuit breaker including an output having a signal with a first state when said circuit breaker is closed and said rotating electrical apparatus is on-line and with a second state when said circuit breaker is open and said rotating electrical apparatus is off-line, said excitation control system comprising:

means for providing said excitation voltage to the input of said rotating electrical apparatus;

means for regulating said excitation voltage;

means for providing an electrical signal related to said output of said rotating electrical apparatus;

means for providing a validation signal when said electrical signal is greater than a predetermined signal;

means for qualifying said signal of the output of said circuit breaker with said validation signal and providing a qualified signal therefrom; and means employing said qualified signal for protecting or tripping said rotating electrical apparatus.

7. The excitation control system of claim 6 wherein said means for qualifying includes means for ORing said signal of the output of said circuit breaker with said validation signal in order to provide said qualified signal therefrom.

8. The excitation control system of claim 6 wherein said rotating electrical apparatus is a generator; wherein said electrical signal is generator line current; and wherein said predetermined signal is minimum generator line current.

9. The excitation control system of claim 6 wherein said rotating electrical apparatus is a generator; wherein said electrical signal is generator watts; and wherein said predetermined signal is minimum generator watts.

* * * * *